United States Patent [19]

Galumbeck

[11] Patent Number: 4,916,539
[45] Date of Patent: Apr. 10, 1990

[54] COMMUNICATIONS SYSTEM HAVING RECEIVERS WHICH CAN BE ADDRESSED IN SELECTED CLASSES

[75] Inventor: Alan D. Galumbeck, Smyrna, Ga.

[73] Assignee: The Weather Channel, Inc., Atlanta, Ga.

[21] Appl. No.: 323,089

[22] Filed: Mar. 14, 1989

Related U.S. Application Data

[63] Continuation of Ser. No. 155,997, Feb. 16, 1988, abandoned, which is a continuation-in-part of Ser. No. 487,244, Apr. 21, 1983, Pat. No. 4,725,886.

[51] Int. Cl.$^4$ .................... H04N 7/08; H04N 7/087
[52] U.S. Cl. .................................. 358/142; 358/141; 358/146; 358/147; 358/84; 340/825.47
[58] Field of Search ............... 358/84, 86, 141, 142, 358/143, 144, 145, 146, 147, 188; 340/721, 802, 825.07, 825.47, 825.5, 825.51, 825.52; 370/85, 86, 94; 455/32, 132, 133, 137, 140

[56] References Cited

U.S. PATENT DOCUMENTS

| | | | |
|---|---|---|---|
| 4,131,881 | 12/1978 | Robinson | 340/825.47 |
| 4,383,257 | 5/1983 | Giallanza et al. | 340/825.47 |
| 4,394,687 | 7/1983 | Hutt et al. | 358/147 |
| 4,429,385 | 1/1984 | Cichelli et al. | 358/146 |
| 4,430,731 | 2/1984 | Gimple et al. | 358/84 |
| 4,761,646 | 8/1988 | Choquet et al. | 340/825.52 |

OTHER PUBLICATIONS

British Broadcasting Corporation, Independent Broadcasting Authority and British Radio Equipment Manufacturer's Association, "Broadcast Teletext Specification," Sep. 1976, United Kingdom (27 pp.).
Colormax Electronic Corp., "Colormax–Cable Captioning–16,000,000 Subs Need it!"(3 pp.).
Group W. Satellite Communications, Westinghouse Broadcasting Co., Inc., "7609 Sat–A–Dat Decoder/-Controller" (2 pp.).
Document entitled "Teletext Timing Chain Circuit," Aug. 1978 (9 pp.).
Document entitled "Teletext Video Processor," Dec. 1979 (9 pp.).
Document entitled "Teletext Acquisition and Control Circuit," Jun. 1980 (16 pp.).
Signetics Corp., "Philips I.C. Product Line Summary, May 1981." (pp. 1, 15 and 16).
Wegener Communications, Inc., "Asynchronous Data Transmission System–Series 2100 VIDATA" (2 pp.).
Zenith Radio Corporation, "VIRTEXT" (7 pp.).

Primary Examiner—Edward L. Coles, Sr.
Assistant Examiner—Michael D. Parker
Attorney, Agent, or Firm—Kilpatrick & Cody

[57] ABSTRACT

A communications system having programmable, addressable receivers that receive, store, process and send digital and conventional video, audio and control signals for use in, among other things, a cable video network. Receivers in this system may receive conventional audio and composite video and digital data signals from sources such as a satellite transponder and video and audio from local sources. The digital data may be processed into textual video data by character generation techniques, as may be other digital data received from a local keyboard, local weather sensors or other digital data communications interfaces. The receivers may be addressed in units or groups for purposes of receiving individually, locally or regionally tailored text information and are typically controlled simultaneously from one control source. The receivers may also be addressed and controlled in classes that do not correspond to such hierarchical structure. The system of the preferred embodiment is particularly well adapted for a weather cable network, since it fulfills the needs of data consumers throughout a large geographic area to have continual, current local and national weather information.

6 Claims, 4 Drawing Sheets

FIG 1

PAGE HEADER (ROW= 0 & 0 PAGE 128)

| CLOCK RUN-IN | CLOCK RUN-IN | FRAMING CODE | ROW NUMBER | ←——— O M C W ———→ | | | PAGE NUMBER | | ←——— A D D R E S S ———→ | | | |
|---|---|---|---|---|---|---|---|---|---|---|---|---|
| 1 | 2 | 3 | 4 | 5 | 6 | 7 | 8 | 9 | 10 | 11 | 12 | 13 | 14 |

| | LINE COUNT | PAGE ATTRIBUTES | LINE 1 ATTRIB. | LINE 2 ATTRIB. | LINE 3 ATTRIB. | LINE 4 ATTRIB. |
|---|---|---|---|---|---|---|
| 15 | 16 | 17 | 18 | 19 | 20 | 21 | 22 | 23 | 24 | 25 | 26 | 27 |

| LINE 5 ATTRIB. | LINE 6 ATTRIB. | LINE 7 ATTRIB. | OMCW EXTENSION | LINE 8/9 ATTRIB. |
|---|---|---|---|---|
| 28 | 29 | 30 | 31 | 32 | 33 | 34 | 35 | 36 | 37 |

FIG 2

TEXT LINE (ROW 0)

| CLOCK RUN-IN | CLOCK RUN-IN | FRAMING CODE | ROW NUMBER | HEIGHT/ WIDTH | CHAR 1 | CHAR 2 | CHAR 3 | CHAR 4 | CHAR 5 | CHAR 6 | CHAR 7 | CHAR 8 | CHAR 9 |
|---|---|---|---|---|---|---|---|---|---|---|---|---|---|
| 1 | 2 | 3 | 4 | 5 | 6 | 7 | 8 | 9 | 10 | 11 | 12 | 13 | 14 |

| CHAR 10 | CHAR 11 | CHAR 12 | CHAR 13 | CHAR 14 | CHAR 15 | CHAR 16 | CHAR 17 | CHAR 18 | CHAR 19 | CHAR 20 | CHAR 21 | CHAR 22 |
|---|---|---|---|---|---|---|---|---|---|---|---|---|
| 15 | 16 | 17 | 18 | 19 | 20 | 21 | 22 | 23 | 24 | 25 | 26 | 27 |

| CHAR 23 | CHAR 24 | CHAR 25 | CHAR 26 | CHAR 27 | CHAR 28 | CHAR 29 | CHAR 30 | CHAR 31 | CHAR 32 |
|---|---|---|---|---|---|---|---|---|---|
| 28 | 29 | 30 | 31 | 32 | 33 | 34 | 35 | 36 | 37 |

FIG 3 — DATE/TIME MESSAGE (ROW=0 & PAGE=0)

| 1 | 2 | 3 | 4 | 5 | 6 | 7 | 8 | 9 | 10 | 11 | 12 | 13 | 14 |
|---|---|---|---|---|---|---|---|---|---|---|---|---|---|
| CLOCK RUN-IN | CLOCK RUN-IN | FRAMING CODE | ROW NUMBER | ←——— O M C W ———→ | | | AM/PM | PAGE NUMBER | PAGE NUMBER | TIME ZONE | DAY | MONTH | DAY OF |

| 15 | 16 | 17 | 18 | 19 | 20 | 21 | 22 | 23 | 24 | 25 | 26 | 27 |
|---|---|---|---|---|---|---|---|---|---|---|---|---|
| MONTH | HOURS | MINUTES | ALT. AM/PM | SECONDS | | | ALT. DAY | ALT. MONTH | ALTERNATE DAY OF MONTH | | ALT. HOURS | ALT. MIN- |

| 28 | 29 | 30 | 31 | 32 | 33 | 34 | 35 | 36 | 37 |
|---|---|---|---|---|---|---|---|---|---|
| UTES | ALT. SECONDS | | | CHECK SUM | | | OMCW EXTENSION | | SPARE |

FIG 4 — SET AD-HOC MARKET (ROW=0 & PAGE=255)

| 1 | 2 | 3 | 4 | 5 | 6 | 7 | 8 | 9 | 10 | 11 | 12 | 13 | 14 |
|---|---|---|---|---|---|---|---|---|---|---|---|---|---|
| CLOCK RUN-IN | CLOCK RUN-IN | FRAMING CODE | ROW NUMBER | ←——— O M C W ———→ | | | | PAGE NUMBER | PAGE NUMBER | ←——— A D D R E S S ———→ | | | |

| 15 | 16 | 17 | 18 | 19 | 20 | 21 | 22 | 23 | 24 | 25 | 26 | 27 |
|---|---|---|---|---|---|---|---|---|---|---|---|---|
| UNUSED | UNUSED | UNUSED | UNUSED | UNUSED | UNUSED | UNUSED | UNUSED | UNUSED | UNUSED | UNUSED | UNUSED | UNUSED |

| 28 | 29 | 30 | 31 | 32 | 33 | 34 | 35 | 36 | 37 |
|---|---|---|---|---|---|---|---|---|---|
| UNUSED | UNUSED | UNUSED | UNUSED | UNUSED | UNUSED | UNUSED | OMCW EXTENSION | UNUSED | UNUSED |

FIG 5 — CLEAR AD-HOC MARKET (ROW=0 & PAGE=254)

| 1 | 2 | 3 | 4 | 5 | 6 | 7 | 8 | 9 | 10 | 11 | 12 | 13 | 14 |
|---|---|---|---|---|---|---|---|---|---|---|---|---|---|
| CLOCK RUN-IN | CLOCK RUN-IN | FRAMING CODE | ROW NUMBER | ←——— O M C W ———→ | | | | PAGE NUMBER | PAGE NUMBER | ←——— A D D R E S S ———→ | | | |

| 15 | 16 | 17 | 18 | 19 | 20 | 21 | 22 | 23 | 24 | 25 | 26 | 27 |
|---|---|---|---|---|---|---|---|---|---|---|---|---|
| UNUSED | UNUSED | UNUSED | UNUSED | UNUSED | UNUSED | UNUSED | UNUSED | UNUSED | UNUSED | UNUSED | UNUSED | UNUSED |

| 28 | 29 | 30 | 31 | 32 | 33 | 34 | 35 | 36 | 37 |
|---|---|---|---|---|---|---|---|---|---|
| UNUSED | UNUSED | UNUSED | UNUSED | UNUSED | UNUSED | UNUSED | OMCW EXTENSION | UNUSED | UNUSED |

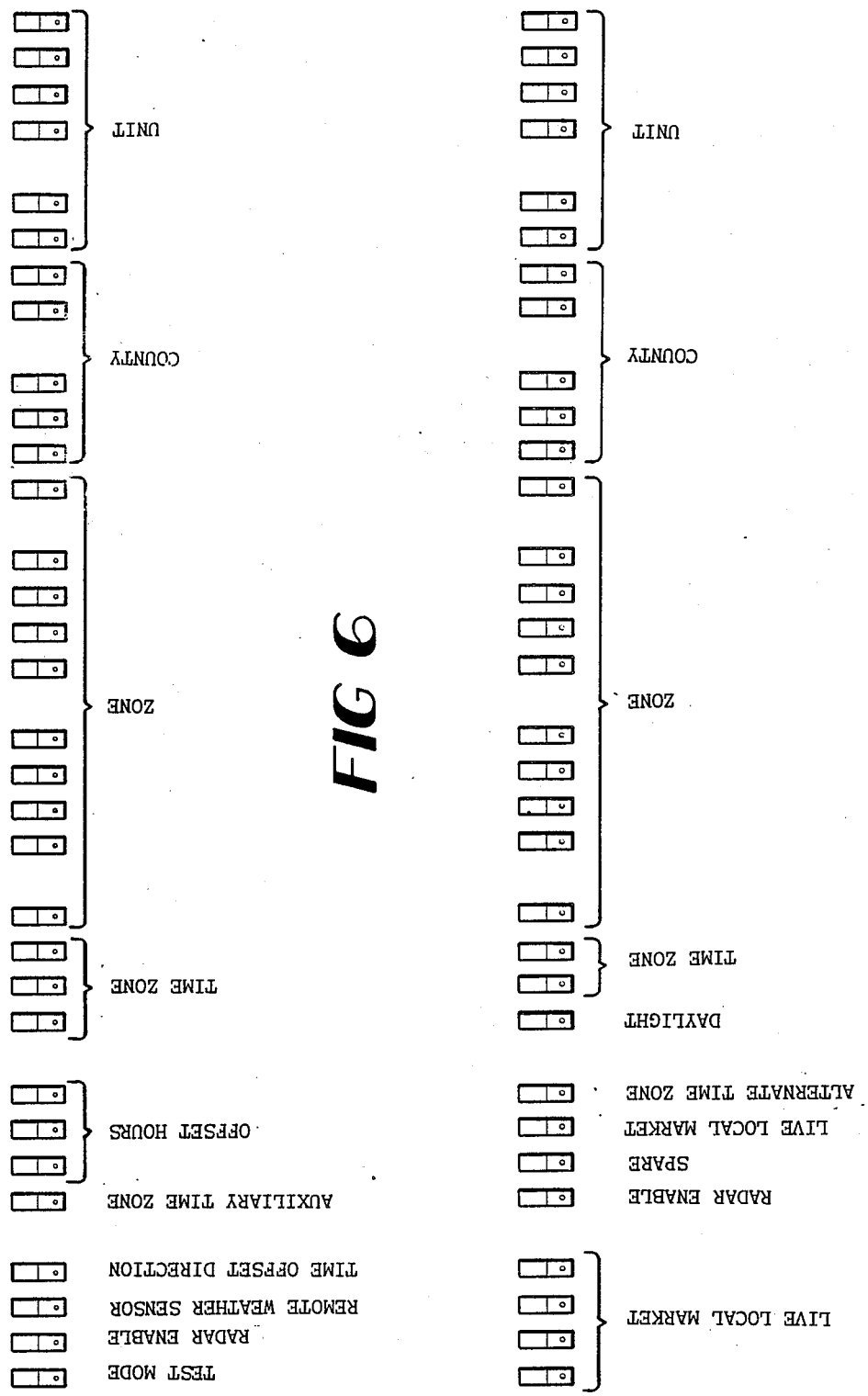

COMMUNICATIONS SYSTEM HAVING RECEIVERS WHICH CAN BE ADDRESSED IN SELECTED CLASSES

BACKGROUND OF THE INVENTION

This is a continuation of co-pending application Ser. No. 155,997 filed on Feb. 16, 1988 now abandoned which is a continuation-in-part of U.S. patent application No. 487,244 filed Apr. 21, 1983 now U.S. Pat. No. 4,725,886 for a Communications System having an Addressable Receiver. That document is incorporated herein by this reference.

This invention relates to a communications system for transmission of audio and combined video, data and control signals to remote receiving locations for retransmission under the command of the control signals.

Transmission of audio and video signals to local receiving stations for immediate use, rebroadcast or recordation for later boradcast is well-established practice, particularly in connection with distribution of television programming by various television networks. Utilization of data to generate characters which are displayed on a video screen over a single color background or another video signal background is also established practice.

However, expansion in the availability of data of both general and specific interest to various groups of data consumers and the need for a system capable of efficiently transmitting such data to specific remote locations and to control the further broadcast, display or transmission of such data at those locations have resulted in the need for audio, video and data transmission systems with associated control capabilities not previously available.

The parent of this document, U.S. patent application No. 487,244, now U.S. Pat. No. 4,725,886, filed Apr. 21, 1983 for a Communications System having an Addressable Receiver, discloses and claims communications systems utilizing a novel hardware and software configuration simultaneously to transmit conventional video and audio program material together with data and control commands within the constraints of conventional television signal specifications to remote signal processors or receivers within the system which receive the entire transmission and process it in a predetermined manner such that the data and the conventional video and audio signals may be utilized at the remote receivers, under network control, particularly for broadcast on local cable television systems.

These systems transmit, typically utilizing a satellite transponder, a first conventional video and audio television signal together with a digital data stream transmitted in the vertical blanking interval of the first video signal. The data stream can also, of course, be transmitted by other methods, such as using a subcarrier frequency. The data stream in the first video signal comprises digital control and address data and digital text data. A local receiver as shown in FIG. 8 may process and retransmit the first video (and audio) signal and, utilizing a character generator, store the digital text data and process it into a second ("satellite" text) video signal containing text for transmission. In addition, the receiver may receive and retransmit a third video (and audio) signal from a local source such as a video recorder, so that local commercials or other material may be displayed, and it provides a synchronization signal which may be input to the local source to synchronize signals from it with other video signals processed or generated by the receiver. So that local cable operators may also be able to compose and display textual data, the receiver may also receive digital data from a keyboard. This data, as well as data from local weather sensors, is processed by the receiver into a fourth video signal containing text. On command from network control, the receiver may select for output the first satellite video (and audio) signal, the third local video (and audio) signal, or a solid color background video signal, and may combine with any of these signals the second (satellite) and/or fourth local textual video signals.

The digital control and address data in the data stream of the first video signal control the operating states, or modes, of such receivers and determine the video, audio and other outputs of a particular receiver. Control data sent in the "Output Mode Control Word" ("OMCW") of the data stream determines, among other things, which video signals or combinations thereof will be presented and which audio signals will be presented, by controlling whether satellite video, local video or character generator input will be processed and sent by the receiver.

The address words of the data stream and the control words following them allow each such receiver or a group of receivers to accept, store and process particular text data and to display this text in a particular format. Thus, different digital text data may be stored by different receivers in groups of receivers for simultaneous presentation in response to the OMCW control data which controls timing of such presentation.

Receivers disclosed in the parent of this document may be utilized for a network of local affiliates receiving transmissions from a single source dedicated to television programming related to weather information and advertising. Accordingly, the hierarchy of addressability utilized in embodiments disclosed in that document contemplates geographic organization of local receivers consistent with weather patterns. That document emphasizes, however, that the invention may also be adapted for transmission of entirely different programming and data for other types of commercial broadcasting and for non-commercial communications, including teletext-only communications, and aspects of the invention may be adapted to other uses such as various remote control networks.

A plurality of such receivers can be organized and addressed hierarchically fior purposes of receiving and processing satellite video and teletext data according to a hierarchical address structure of four sub-fields: Service, Zone, County, and Unit. The address of a receiver is set by positioning switches in the receiver. The receiver compares or matches sub-fields in addresses of received data one sub-field at a time to determine whether messages are addressed to it.

It has recently become useful, however, to arrange and control classes of receivers not according to geographical location or a hierarchical structure, but according to other criteria such as, for instance, a certain market such as a metropolitan area comprising portions of several counties or zones. Advertisers appreciate this capability as well as viewers who wish to receive the same information as others in their area without discrimination according to geographic boundaries or other hierarchical structures.

SUMMARY OF THE INVENTION

The present invention supplements the capabilities of the receiver disclosed and claimed in the parent of this document by allowing receivers to be controlled according to preselected classes independent of their hierarchical address structures. This additional capability results from changes to software in the receivers and the structure of data sent to them, as disclosed more fully below.

Other additional capabilities according to the present invention are the ability to cause receivers to enter to a "Crawl Alert" mode or state with satellite video and audio and with a solid color background in the bottom region of the screen across which messages may crawl, accompanied by intermittent audio signals.

The invention also allows receivers to display remotely collected weather observations, such as those from local meterological offices, if they sense loss of connection with their corresponding temperature probes, and to display crawl text corresponding to weather warning information stored in RAM. The invention further allows for the rainfall counter circuits to be easily reset or updated from the receiver's keyboard.

Other objects, features and advantages of the invention will become apparent with reference to the remainder of this document.

BRIEF DESCRIPTION OF THE DRAWINGS

FIG. 1 is a block diagram of the data framing scheme for a page header of a text page for transmission in accordance with the preferred embodiment of the present invention.

FIG. 2 is a diagram similar to FIG. 1 for any text row 1-9.

FIG. 3 is a diagram similar to FIG. 1 for a date/time row.

FIG. 4 is a diagram similar to FIG. 1 for a command message to reset and ad hoc flag in receivers.

FIG. 5 is a diagram similar to FIG. 1 for a command message to clear ad hoc flags in receivers.

FIG. 6 is a schematic diagram of bit values for switch settings for receivers according to the present invention.

FIG. 7 is a schematic diagram of bit values for switch settings for receivers according to the invention of the parent of this document.

DETAILED DESCRIPTION OF THE DRAWINGS

Figure 8:
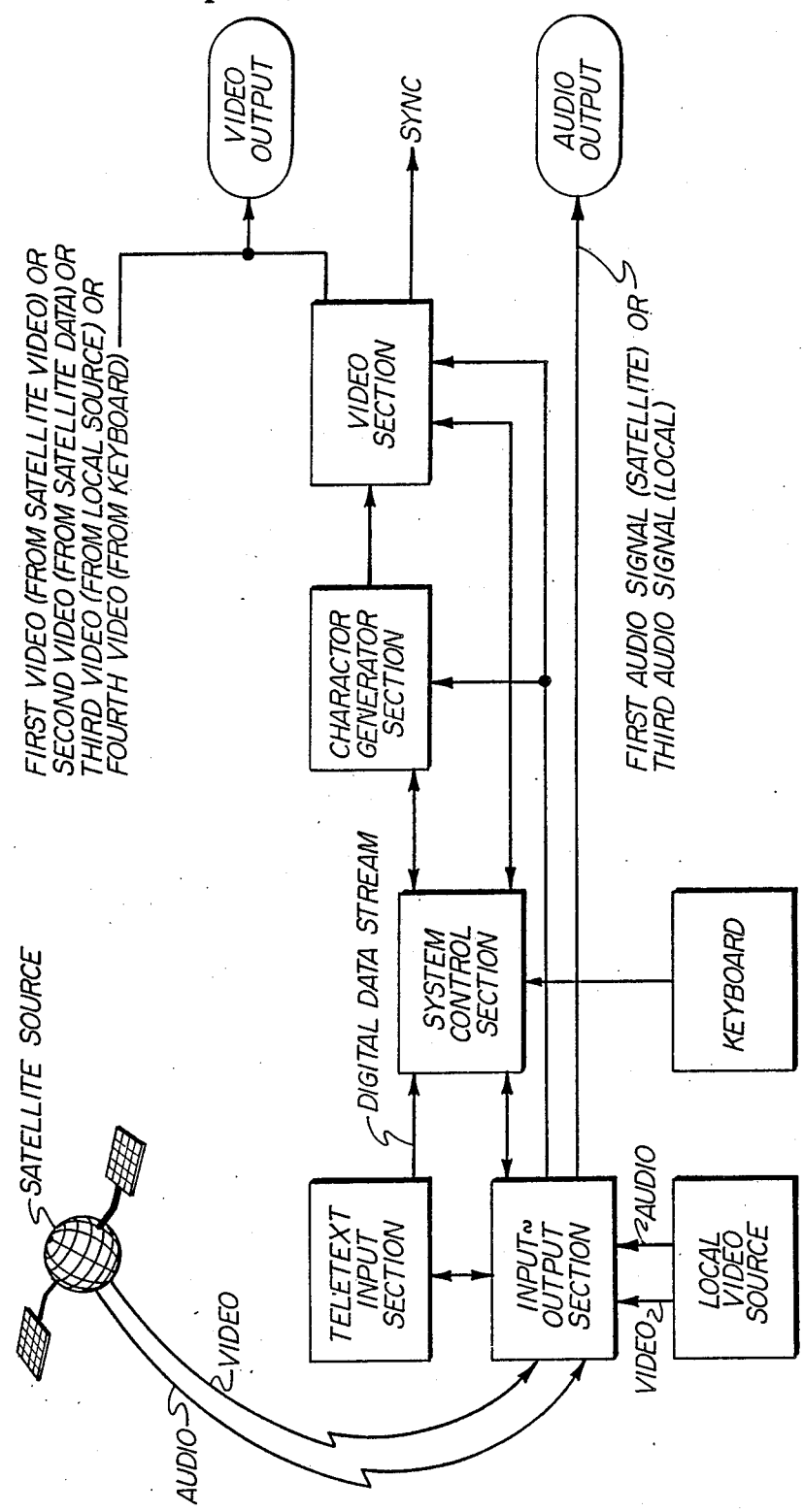
FIG. 8 is a block diagram showing major sections of a receiver according to the present invention.

Techniques of the present invention may be utilized with receiver hardware such as that disclosed and claimed in the parent of this document.

Referring to FIG. 1, which shows page header line (or row) framing in accordance with the present invention, the first 33 of the 37 bytes of that line remain the same as disclosed in the parent of this document. The first two bytes are clock run-in bytes and the third byte is a framing code byte. Byte 4 is a row number byte which comprises a four-bit binary number having a decimal range of 0 to 9. Zero identifies the row as a header and a value of 1 to 9 identifies a line of text (see discussion of text line below) and specifies its sequence in the page. Each text page comprises ten lines or rows numbered 0 through 9. The first line is a page header and each page is numbered. Page number 0 is reserved so that a call for its display can be used to indicate that no text is to be displayed.

Bytes 4-37 are all hamming code bytes, as are bytes 4 and 5 of the text line shown in FIG. 2, bytes 4-37 of the date/time message line shown in FIG. 3, and bytes 4-16 and 34-35 of the set ad hoc market and clear and hoc market lines shown in FIGS. 4 and 5.

The page header (as well as the date/time message and set ad hoc market) lines include in bytes 5-8 an "Output Mode Control Word" (abbreviated "OMCW") which is the mechanism for exercising real-time control over the "on-air" transmission of receivers. The OMCW sub-fields containing data bits are, left to right, as follows:

a. A "Local Program" one bit flag is used to select the on-air audio and video source and to activate a corresponding LED and solid state switches in the Logic Output Section of the receiver. If the "Local Program" bit is on (i.e., "1") and local video is present then:
1. local video is selected,
2. local audio is selected regardless of the state of the Special Audio bit (described below),
3. the local program LED is turned on,
4. the local program solid state switch is turned on, and
5. all character generator group output is suppressed regardless of other indications in the OMCW.

If the Local Program bit is off (i.e., "0", or local video is not present, then:
1. satellite video is selected,
2. satellite audio is selected unless the Special Audio bit is on,
3. the local program LED is turned off,
4. the local program solid state switch is turned off, and
5. character generator group output is as called for in the balance of the OMCW.

b. A "Local Pre-roll" one bit flag activates (0=off; 1=on) an isolated external control circuit which may be used to cue-up a video recorder machine.

c. An "Auxiliary Audio" one bit flag selects the auxiliary local audio input as the on-air source, over-riding the audio source specified by the Local Program bit. It also activates an isolated external control circuit which may be used to control a local audio source and LED indicator. Thus, 0=Audio follows video, and 1=Auxiliary Audio over-ride.

d. An "Alarm" or "Weather Warning" one bit flag (0=off; 1=on) activates an electromechanical relay and an isolated external control.

e. A "Radar" one bit flag is used in conjunction with a Radar Enable switch and presence of local video input to select the local video source and to activate a solid state switch which may be used to turn on a video signal depicting a radar picture. It never affects the on-air audio source. If the Radar bit is on (i.e.,=1), the local program bit is off, the Radar Enable switch is on and local video is present then:
1. local video is selected,
2. the radar solid state switch is turned on, and
3. all character generator output is suppressed regardless of other indications in the OMCW.

If any of the conditions above ae not met then the local program bit prevails.

f. A "Region Separator" one bit flag (0=on; 1=off) acts as the separator attribute of the first text line of the bottom text region.

g. A "Top Solid Background" one bit flag (0=title-over; 1=solid background) selects either title-over or solid color background display of text in the upper text region.

h. A "Bottom Solid Background" one bit flag (0=title-over; 1=solid background) selects either title-over or solid color background display of text in the lower text region.

i. A "Top Text Page" six-bit binary number specifies the page to be displayed in the upper text region. Page number "0" is a pseudo-page of zero lines.

j. A "Bottom Text Page" two-bit binary number specifies the text to be displayed in the bottom text region. Bottom Text Page=0 is a pseudo-page of zero lines, =1 means display date/time and weather instruments readings, =2 means display local crawl and =3 means display alternate crawl from text page 51 (weather warning information).

Bytes 9 and 10 are the "Page Number," an eight bit binary page number in the range 0 to the maximum number of pages. Page 0, Row 0, as stated above, is utilized as a date/time record. Page numbers greater than or equal to 128 are reserved for non-text messages. Page numbers 254 and 255 are currently implemented instances of such messages and are described below.

The "Address" field, bytes 11-16, comprising twenty-four data bits (in addition to twenty-four Hamming Code Bits) allows a plurality of receivers to be organized and addressed hierarchically for purposes of receiving and processing satellite video and teletext data. Thus, certain teletext messages may be addressed only to, and stored and processed only by, a particular receiver (a "Unit") or a group or groups of receivers ("County," "Zone" and "Service"). In accordance with this ability, the address is a hierarchical structure of four sub-fields which are, left to right: "Service" (3 bits), "Zone" (10 bits), "County" (5 bits), and "Unit" (6 bits). The address of each receiver may consist of Service 001 or another service number stored in ROM and twenty-one bits, representing the remaining sub-field values, set into receiver switches in the Switch Input Section of the receiver. Address matching proceeds one sub-field at a time, from left to right. If a received sub-field contains a value of zero, the sub-field and all succeeding sub-fields are considered to match the corresponding sub-fields of the receiver without further comparison. Thus, for instance, an address containing a value of zero for "County" would match all receivers having the "Zone" of that address.

Byte 17 is the "Line Count," a four bit binary number in the range 0 to 9 establishing the line count attribute for display and the highest row number to be received in the current page.

Bytes 18 and 19 are "Page Attributes," a collection of one bit display attributes and one bit mode change commands. These mode change commands provide the only mechanism for forcing a change in operating mode on an addressable basis, since in the NORMAL mode (described below) the OMCW is processed independent of the destination address of the rest of the message. The eight Page Attribute bits are utilized, reading left to right, in the described embodiment as follows:

a. An "Unused" bit is reserved for future use.

b. A "Freeze" bit forces a transition into FREEZE mode.

c. A "Weather Advisory" bit forces a transition into ADVISORY mode.

d. A "Weather Warning" bit forces a transition into WARNING mode.

e. An "Unused" bit is reserved for future use.

f. A "Flip" bit indicates that the display of any chained pages will be accomplished by successive display of one page at a time.

g. A "Roll" bit indicates that the display of any chained pages will be accomplished by continuous text roll.

h. A "Chain bit indicates that the next higher numbered page is logically attached to this page.

"Line attributes" occupy eight successive fields of two bytes each, bytes 20-33. Bytes 36 and 37 are line attributes for both lines 8 and 9 of a page of text. Each two-byte field 20-33 contains display attributes for its corresponding text line. Left to right, these are:

a. A "Separator" bit that indicates the display of a solid separator bar above the corresponding line of text.

b. A "Flash" bit that indicates that the text will flash off and on.

c. A "Reverse" bit that indicates that any text or separator will appear in black rather than white and that the character borders, if present, will be white rather than black.

d. A "Border" bit that indicates a contrast border around the edges of the characters.

e. A four bit "Color" code that indicates the background color associated with the line.

Bytes 36 and 37 control display attributes for both lines 8 and 9 of text.

As shown in FIGS. 1 and 2-5, Bytes 34 and 35, which were previously occupied by line 8 display attributes, form an OMCW Extension. Each byte comprises four data bits and four hamming code bits. The OMCW Extension forms the low order portion of the Extended OMCW. The OMCW Extension is defined as follows, reading left to right:

A. Three unused bits.

B. Five "market" bits.

The remaining bits are four hamming code bits located to the left of the data bits in each byte.

The text line of FIG. 2 may be the same as that disclosed in FIG. 41 of the parent document. The first five bytes are two clock run-in bytes, a framing code byte, a row number byte, and a height/width byte. The remainder of the bytes correspond to characters of text.

Referring to FIG. 3, the date/time message line (row 0, page 0) utilizes the framing described for a page header for its first ten bytes. Byte 11 is the "time zone" indicating the time zone that the accompanying date and time apply to, utilizing a three-bit code designating time zone and whether daylight savings time is to be used. The setting of three corresponding switches in the receiver provide the receiver with the ability to process only matching date/time messages. Byte 12 is the day of the week; byte 13 is the month of the year; and bytes 14 and 15 are the day of the month. Byte 16 is the hour of the day; bytes 17 and 18 are the minute; bytes 19 and 20 are the seconds; and byte 21 communicates a.m. or p.m.

Bytes 22-31 may be used for alternative date and time information in a format similar to bytes 12-21. The setting of a switch in the receiver determines which of the two groups of date and time information will be processed. A check sum byte field occupies bytes 32 and 33. It contains the low-order eight bits of the arithmetic sum of the four-bit de-hammed data portions of the 21 bytes, beginning with the byte following the page number and ending with the byte preceding the check sum. Bytes 34 and 35 contain the OMCW Extension and bytes 36 and 37 are unused.

Bytes 1–10 and 34 and 35 of the set ad hoc market and clear ad hoc market lines as shown in FIGS. 4 and 5 are the same as those in the page header and date/time message line. The other bytes in these lines are unused.

Text page headers may hvae a page number between 1 and 127. Thus, using 8-bit two's compliment arithmetic page number is non-zero and non-negative. The page number 255 in a row 0 is a set ad hoc market line which sets the ad hoc flag in receivers to which it is addressed, while page number 254 in a row 0 is a clear ad hoc market line which clears the ad hoc flag in receivers to which it is addressed.

As shown a comparison of in FIGS. 6 and 7, the switches in receivers can be redesignated to accommodate these new data lines. The right-most 24 switches corresponding to time zone, zone, county and unit, respectively, remain the same. In the other 8 switches, the left-most 4 switches correspond to the "market" mentioned above in connection with the Extended OMCW. The 5th switch is a radar enable switch, the 6th switch is a spare, the 7th switch is the fifth (low order) live local market switch, and the 8th switch is the alternate time zone.

Non-hierarchical classes of receivers may be controlled in two ways in accordance with this format. First, they can be addressed when their combination of market switch settings match the market bits contained in the OMCW Extension of data lines. Second, they can be addressed by addressing individual or groups of receivers and sending set ad hoc market lines to the addressed receivers. A value in the range of 1 to 30 for the five market bits is used to address desired receivers with corresponding market bit switch settings. A market bit value of 31 in the OMCW Extension specifies the current class of receivers in which the ad hoc market flags are set.

The system control or teletext program, written in Intel 8085 Macro Assembly Language, is assembled and the resulting machine code stored in a ROM chip for inclusion in receiver 110. The complete assembly listing appears below. The main body of this program, which is entered as a result of a CPU hardware reset, performs certain system initialization functions and then repeatedly executes a loop consisting of various housekeeping chores. The balance of the program consists of interrupt service routines that are invoked by hardware interrupts, which occur asynchronously with respect to execution of the main program body, and by software RST instructions.

Main Program Body

Entry to this routine is through the 8085A reset vector address. The program begins system initialization by setting the stack pointer to the base address of the stack. Next, the alarm relay and all of the solid state switches are turned off and the satellite video signal is selected. Then the front panel LEDs are turned off and a delay loop of approximately two seconds' duration is entered to allow the rest of the receiver hardware to stabilize. The 32 switch inputs are then read and saved and all maskable interrupts are disabled.

A group of software controlled timers are then zeroed. All of these timers will subsequently be counted in half-second intervals. Since no half-second clock exists in the system, one is simulated using the TRAP interrupt which occurs at NTSC television vertical frequency (59.94 Hz) and a software counter that is initialized here for 30 counts.

Next a group of flags is initialized. Then a buffer that is used to format weather sensor readings is initialized and the first sensor input values are read and placed in the buffer. The USART control registers are then initialized to enable serial data communications. The program then performs set-up of the DMA Controller for subsequent teletext data storage. A value corresponding to a received double bit error is placed into the row number field of each line of the four-line teletext data buffer in memory. This insures that the contents of a line buffer will later be discarded by the program if no teletext data is received in the corresponding line of the satellite video signal.

Initialization continues with the sending of a reset message across the inter-process link to the character generator control processor. Finally, the necessary actions are taken to establish NOSAT mode.

The main program then enters a loop where it will remain as long as the receiver continues in operation. In this loop the software timer for the audio beeper is checked. If it is active and its maximum count has been reached, the beeper is turned off. The 32 switch inputs are then read. A software controlled weather sensor time is checked, and if it has expired the local weather sensors are read. If the temperature sensor reading is at its extreme over-range value, indicating that a short circuit jumper has been installed across the temperature sensor input terminals, a special sensor message is formatted to inform the Character Generator Controller processor that the contents of text page 50 is to be used in lieu of actual sensor readings. Otherwise, a sensor message containing the actual readings is formatted. In either case a flag is set to indicate that the sensor message is ready for transmission to the Character Generator Controller processor. Control is then returned to the beginning of the loop.

RST1 Routine

This software invoked routine saves the status of all of the 8085A registers on the stack.

RST2 Routine

This software invoked routine restores the previously saved status of the 8085A registers from the stack.

RST3 Routine

Unused.

RST4 Routine

Unused.

TRAP Routine

This is a hardware interrupt service routine. It is entered at the beginning of each vertical sync pulse (VDRIVE) from the Gen Lock Section. For proper system operation, the execution time of this routine must be short enough that it will be completed before the occurrence of the RST5.5 interrupt caused by the sync pulse of video line 18. This routine must therefore complete in less than 1.08 milliseconds.

This routine first saves the processor state. Since the 8085A TRAP interrupt cannot be masked, a check is made to see if the main program is still performing initilization. If so, the processor state is restored and this routine is exited. Otherwise the routine continues.

All timers that use 1/60 second counts are incremented. If the ½ second interval counter has expired, it is reset and all of the timers that use ½ second counts are incremented. The satellite video present detector is read. If satellite video is not present and the system is not in NOSAT mode, WARNING MODE or ADVISORY mode, then NOSAT mode is established. If satellite video is not present and the system is already in NOSAT mode, the three hour timer is checked. If it has expired, a reset message is sent to the Character Generator Control processor to cause reinitialization of all stored text pages.

If video is present and the system is in NOSAT mode, the video present software timer is checked. If video has been present for one second, then NOSAT mode is exited and NOCTL mode is established.

If video is present and the system is in WARNING mode or ADVISORY mode, the two minute software warning and advisory timer is checked. If it has expired, the current mode is exited and NOCTL mode is established.

If video is present and the system is in NORMAL mode, the good OMCW software timer is checked to determine if a full second has elapsed without receiving a valid OMCW. If it has, then NORMAL mode is exited and NOCTL mode is established.

In all cases, this routine concludes by checking a five second software timer to determine if it is time to send sensor readings to the Character Generator Control processor. If so, it sets a flag and resets the timer. Finally the processor state is restored and the TRAP routine is exited.

RST5 Routine

Unused.

RST5.5 Routine

This is a hardware interrupt service routine. It is entered at the beginning of the horizontal sync pulse for video line 18 as indicated by the signal WEN. It is this routine that processes received teletext data. Its execution must be completed before the next TRAP occurs. Execution must therefore not require more than 15.6 milliseconds.

This routine first saves the state of the processor on the stack and resets the signal that invoked it. It then checks to see if local video is present and sets an LED to so indicate. If local video is not present a check is made to determine if local video is currently selected. If so, it is deselected, satellite video is selected and the remaining functions of the current OMCW are appropriately activated.

A processing loop is then entered which will be executed four times, once for each of the four teletext data lines contained in the current video field. The ROW NUMBER field is de-hammed by table look-up. If the ROW NUMBER contains a double bit error then a flush flag is set so that the balance of the current message will be ignored and no further processing of this line is performed.

If the row number is zero than the OMCW, the OMCW EXTENSION, the ADDRESS and the PAGE NUMBER are de-hammed and packed. If the PAGE NUMBER contains a double bit error the flush flag is set and no further processing of this line is performed. If the PAGE NUMBER is zero, then this line is a DATE/TIME message and it is processed accordingly and, depending upon the ALTERNATE TIME ZONE switch of the switch inputs either the primary or the alternate date and time field, is sent to the Character Generator Control processor if its TIME ZONE field matches the code in the corresponding three switches of the switch inputs. Processing of a DATE/TIME message then continues with the OMCW field as described below.

If the ROW NUMBER is zero, the OMCW and the OMCW EXTENSION, together referred to as the EXTENDED OMCW, are now processed. If they are error free and match the last received EXTENDED OMCW then the current system mode is checked. If the system is in NORMAL mode, then the MARKET field of the OMCW EXTENSION is checked. If it is non-zero and either it is less than 31 and it matches the value set in the five MARKET switches of the switch inputs or it is equal to 31 and the internal AD HOC flag is currently set then the current OMCW is set to 2000-hex and the remainder of the received OMCW is ignored. This causes the auxiliary audio channel to be selected for retransmission along with satellite video. By supplying the auxiliary audio input from an additional audio channel transmitted to the cable system via satellite this makes possible the retransmission of customized live audio and video programming by receivers in the selected market while receivers in other markets retransmit text over a solid background accompanied by the first audio signal under the control of the remainder of the OMCW.

If the MARKET field conditions above are not met then the two minute Crawl Alert count-down timer is examined. If that timer is non-zero, indicating that a Crawl Alert is in effect, then the BOTTOM TEXT PAGE field of the new OMCW is forced to a value of three and the BOTTOM SOLID BACKGROUND bit in the new OMCW is forced on. Finally the new OMCW is saved as the current OMCW and all of the conditions it now specifies are established. If the system is in NOCTL mode and the newly received OMCW value has both its LOCAL PROGRAM and LOCAL PREROLL bits off then NOCTL mode is exited, NORMAL mode is established, the new OMCW is saved as the current OMCW and the conditions it specifies are established.

It is important to note that this OMCW processing occurs regardless of the contents of the ADDRESS field, and thus provides simultaneous real-time control of all of the receivers 110 in a network.

Processing of a line with ROW equal zero and PAGE not equal zero continues with the already de-hammed ADDRESS field. If this field contains any double bit errors then the flush flag is set and the balance of the line is not processed. Otherwise, hierarchical address checking is performed. This is done by left to right processing of the subfields SERVICE, ZONE, COUNTY and UNIT. For each subfield of the message address, the subfield is tested for a value of zero. If it is not zero it is compared to the corresponding subfield of the receiver's address. If the message subfield is either zero or equal to this receiver's value then the subfield is considered to be "matched." If all subfields are "matched" then the message is for this receiver, so the flush flag is turned off, the "Unit Addressed" LED is turned on and processing of the balance of this line and of any ensuing lines of this message will be performed. If any subfield fails to be "matched" then the flush flag is turned on, the "Unit Addressed" LED is turned off and the balance of this line is not processed further.

If the message is addressed to this receiver and the PAGE NUMBER is 255 then the internal AD HOC flag is set and processing of this message is complete.

If the message is addressed to this receiver and the PAGE NUMBER is 254 then the internal AD HOC flag is cleared and processing of this message is complete.

If the message is addressed to this receiver and the PAGE NUMBER is greater than zero but less than 128 then this is a Page Header for a text page, and the balance of the line is de-hammed and used to create a page header message which is sent to the Character Generator Control processor. The saved row number is set to zero, and the processing of the line is completed.

If the received line has a non-zero ROW NUMBER the flush flag is tested. If it is on then no further processing of this line is performed. If it is off and the received ROW NUMBER is not greater than the previously saved row number then the flush flag is turned on and no further processing of this line will be performed. If the flush flag is off and the ROW NUMBER is greater than the previously saved row number then the new ROW NUMBER value becomes the saved value and the line is processed. This is done by de-hamming the HEIGHT/WIDTH field and then sending the line to the Character Generator Control processor.

For all of the previously mentioned conditions, if the flush flag is on or is turned on then the received line does not have to be sent to the Character Generator Control processor. This creates an available period of toime that is used to send a sensor message to the Character Generator Control processor if the main program has set the sensor message ready flag. Whenever a sensor message is sent, the ready flag is cleared.

After processing all four teletext lines in the above processing loop, this interrupt service routine performs the necessary initialization for the next DMA operation, restores the processor status from the stack and exits.

RST6 Routine

Unused.

RST6.5 Routine

This is a hardware interrupt service routine which is entered whenever the USART in the Serial Data Communications section completes the sending or receiving of a character.

RST7 Routine

Unused.

RST7.5 Routine

This hardware interrupt service routine is entered as the result of the Character Generator Control processor acknowledging receipt of a transfer of data across the interprocessor link. The RST7.5 interrupt is in fact masked at all times so that the routine is never actually entered. Instead, the RST7.5 interrupt pending status is used as a flag to synchronize transmission to the Character Generator Control processor.

CRAWL ALERT STATE

The present invention also allows for receivers to display messages that crawl across the bottom of the screen while satellite video appears on the upper portion. The previously unused bit in the page attributes field of the page header line is redefined as the crawl alert bit. Receivers may enter the crawl alert state upon receipt and storage of the last line of a text page that has the crawl alert bit on the page attributes field of its header.

Upon entry into the crawl alert state, the "Bottom Solid Background" flag is set to 1 and the "Bottom Text Page" is set to 3 in the active OMCW and in all subsequently received OMCW's for 2 minutes. This provides for alternate crawl display on a solid color background in the bottom region of television screens controlled by the receiver while maintaining video on the rest of the screen along with audio in accordance with the current OMCW and subsequently received OMCW's. An intermittent audio signal will be added to the audio output, mixed over the program audio, the total duration of which is approximately five to six seconds.

If satellite video is lost for 45 consecutive video fields while in crawl alert mode, the active OMCW is forced to 2707-hex and the crawl alert mode will continue to normal conclusion.

ALTERNATE SENSOR DATA

If a receiver detects that its corresponding temperature probe is not connected, then instead of suppressing the display of all sensors, the lines of page 50 (remotely collected weather observations such as those from local meteorological offices) will be displayed one by one beneath the date/time line on screens for televisions controlled by the receiver. The line count field in row 0 of page 50 will be used to establish the last line to be displayed before returning to the first line. If text from page 50 is being displayed in lieu of sensor data and the bottom solid background bit in the OMCW is on, the background color for the entire bottom text region and the bottom safe region will be taken from the color attribute for line 1 of page 50. If, on the other hand, the line count in page 50 is 0, then a blank line will be displayed and the color will be set to blue (color 5).

ALTERNATE CRAWL

A value of 3 in the Bottom Text Field in the OMCW may be defined as the Alternate Crawl bit. When this value occurs, the on-screen display will be the same as for the Local Crawl with only the following three exceptions. First, the text will be from RAM text page 51 (weather warning information). Second, the background color associated with the bottom text region and the bottom safe region is the line 1 color attribute from page 51. Third, the number of characters in the message is taken to be 32 times the line count attribute of the page.

The foregoing is provided for purposes of explanation and illustration. Modification and enhancements to the embodiment disclosed in this document may be made without departing from the scope and spirit of the invention.

What is claimed is:

1. An addressable receiver for receiving video and digital data signals, transmitting video output signals and controlling external devices, comprising:
    (a) means for processing the video and digital data signals into a first video signal available for receiver output, a synchronization signal available for receiver output, and a serial digital data stream for controlling the receiver;
    (b) means for processing the digital data stream to recognize within such stream control words;

(c) means for storing digital data contained in the digital data stream;

(d) means for recognizing within the digital data stream hierarchical addresses, controlling the means for storing digital data selectively to store data in accordance with the hierarchical address preceding such data and;

(e) means for recognizing within the digital data stream non-hierarchical designator data;

(f) means for converting stored digital data into a second video signal containing characters and available for receiver output; and (g) means responsive to the digital data stream for controlling the receiver output.

2. An addressable receiver in accordance with claim 1 further comprising means for setting a flag in the receiver to designate the receiver to be in a class of receivers, means for recognizing in the digital data stream non-hierarchical designator data for controlling the receiver output when the flag is set; and means responsive to said data for controlling the receiver outputs.

3. An addressable receiver for receiving video and digital data signals, transmitting video output signals and controlling external devices, comprising:

(a) means for processing the video and digital data signals into a first video signal available for receiver output, a synchronization signal available for receiver output and a serial digital data stream for controlling the receiver;

(b) means for processing the digital data stream to recognize within such stream control words;

(c) means for processing the digital data stream to recognize within such stream hierarchical addresses and for storing digital data addressed to said receiver in accordance with a hierarchical address contained in such data;

(d) means for processing the digital data stream to recognize within such stream non-hierarchical designator data for controlling operation of the receiver in accordance with such data;

(e) means for converting stored digital data into a second video signal containing characters, which signal is synchronized with the synchronization signal, (f) means for receiving a third video signal;

(g) means for processing at least one of the control words into at least one command signal;

(h) means for receiving a second data signal;

(i) means for processing the second data signal into a fourth video signal containing characters;

(j) means for combining the first or third and either or both the second and fourth video signals into an output-available signal;

(k) means responsive to the control words and the designator data for controlling the receiver's output of the synchronization signal, the command signal and the output-available signal;

(l) means responsive to a flag contained in the digital data for overriding said transmitting means responsive to the control words to cause the receiver to immediately to alter its output signal; and (m) means responsive to interruption of receipt of the signals for transmitting a predetermined video output signal.

4. An addressable receiver in accordance with claim 1 or 3 including at least one programmable device.

5. An addressable receiver according to any of claims 1, or 3 further comprising:

(a) means for receiving first audio signal, a second audio signal and a third audio signal;

(b) means for processing the audio signals into a corresponding first audio signal, second audio signal and third audio output-available signal; and (c) means responsive to the control words and the designator data for controlling the receiver output of the output-available audio signals.

6. A communication system comprising a teletext transmitter and a plurality of addressable receivers adapted to receive teletext transmissions from the transmitter, and, responsive to hierarchical addresses and non-hierarchical designator data contained in such transmissions, process selected portions of such transmissions, in which system the hierarchical addresses define a plurality of hierarchical group levels in addition to the level comprising all the receivers and the level comprising only one receiver, such that receivers in subgroups of a hierarchical group level may be addressed by addressing that group level.

* * * * *